April 5, 1966 V. H. HOFMANN 3,244,991

DEMODULATOR FOR FM SIGNALS UTILIZING PULSE FORMING CIRCUITRY

Filed Dec. 7, 1962 2 Sheets-Sheet 1

INVENTOR.
VICTOR H. HOFMANN
BY
Christie, Parker & Hale
ATTORNEYS.

April 5, 1966 V. H. HOFMANN 3,244,991

DEMODULATOR FOR FM SIGNALS UTILIZING PULSE FORMING CIRCUITRY

Filed Dec. 7, 1962 2 Sheets-Sheet 2

INVENTOR.
VICTOR H. HOFMANN
BY
Christie, Parker & Hale
ATTORNEYS.

3,244,991
DEMODULATOR FOR FM SIGNALS UTILIZING PULSE FORMING CIRCUITRY

Victor H. Hofmann, Altadena, Calif., assignor to Consolidated Electrodynamics Corporation, Pasadena, Calif., a corporation of California Filed Dec. 7, 1962, Ser. No. 243,055
7 Claims. (Cl. 329—128)

This invention relates to demodulators and more particularly is concerned with a demodulator for frequency modulated signals having a large frequency deviation.

In magnetic recording and reproducing systems for wide band recording, frequency modulation is commonly employed. Because of the band width limitations of magnetic recording, the frequency deviation produced by the modulation is wide in relation to the carrier. For example, the maximum frequency deviation may be as large as ±95% of the carrier frequency. The usual discriminator circuits do not provide sufficient linearity over such a wide frequency deviation and so demodulators have been developed using a pulse averaging technique. Such pulse averaging demodulators are arranged to generate pulses at the zero crossover points of the frequency modulated signal. The pulses are then passed through a low-pass filter. The "on" time to "off" time of one pulse cycle, i.e., the duty cycle, is set to fifty percent of the center frequency to allow easy adjustment of the D.C. zero of the demodulated signal.

As the frequency varies due to modulation, the duty cycle of the pulse signal varies, changing the D.C. component, which component is derived at the output of the low-pass filter.

Known circuits for accomplishing pulse averaging demodulation of FM signals have encountered practical difficulties in getting a linearity in the relation of output voltage with variation in frequency about the center frequency over a wide deviation range, particularly at higher carrier frequencies. To achieve a maximum degree of linearity, the pulse area of the pulses generated at the zero crossover points of the FM signal must be constant in area over the full frequency range.

The present invention is directed to a pulse averaging type demodulator for frequency modulated signals which is capable of providing linearities of less than 0.1% for frequency deviations up to ±95% of the carrier frequency. This improved linearity is accomplished, according to the present invention, by means of an improved pulse generating circuit capable of producing constant area pulses over a wide range of pulse repetition rates. Further, two such circuits are paired and triggered alternately. The two circuits are interconnected in a manner to provide simple adjustment of the zero D.C. output at the carrier or center frequency and simple independent adjustment to provide complete cancellation of the fundamental frequency in the combined output of the two pulse generating circuits.

In brief, the present invention provides a demodulator in combination with means for squaring the modulated signal and splitting the squared signal into two signals of opposite phase. Separate pulse trains are derived from the two squared signals, each pulse train having pulses coincident with the leading edge of the positive-going portion of the corresponding squared signal. The two trains of pulses are used to trigger two unique monostable multivibrator type circuits to generate corresponding pulses of constant area. The time constant of the two multivibrators are adjusted to provide a fifty percent duty cycle at the carrier frequency. The outputs of the two multivibrators are combined, amplitude limited, and applied to a low-pass filter. The demodulated signal is derived from the output of the filter.

For a more complete understanding of the invention, reference should be made to the accompanying drawings, wherein.

Figure 1:
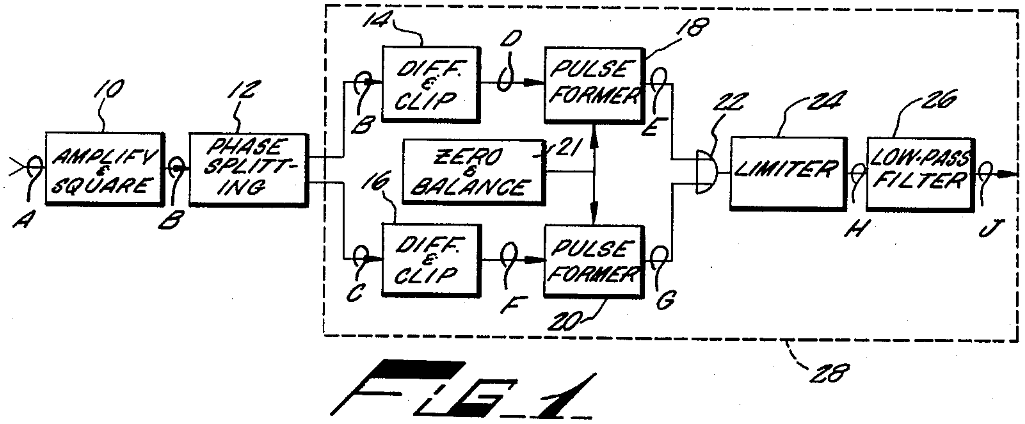
FIGURE 1 is a schematic block diagram of the complete demodulator.
Figure 2:
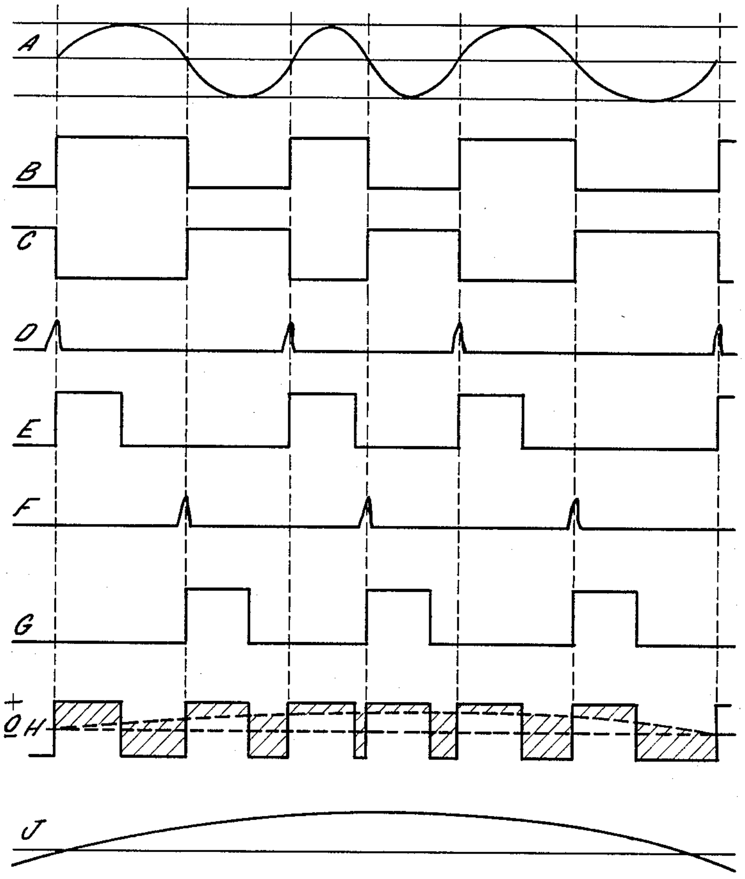
FIGURE 2 shows a series of wave forms generated within the demodulator of FIGURE 1.

Referring to FIGURE 1 in detail, the frequency modulated carrier signal is applied to an amplifying and squaring circuit 10. The wave form of the input to the circuit is shown in FIGURE 2A. The letters in FIGURE 1 identify the corresponding wave forms in FIGURE 2. The amplifying and square circuit 10 includes a series of amplifying and limiter or clipping circuits by which the sinusoidal type wave form is squared to better define the zero crossover points, as shown by the wave form of FIGURE 2B.

The output of the amplifying and squaring circuit 10 is applied to a phase splitting circuit 12 which provides two output signals of opposite phase. One phase corresponds to the wave form of FIGURE 2B and the other phase corresponds to the wave form of FIGURE 2C.

One output of the phase splitting circuit 12 is applied to a differentiating and clipping circuit 14 which provides a poistive pulse (see FIGURE 2D) at the leading or positive-going zero crossover point of the squared input signal. The other output from the phase splitting circuit 12 is applied to a similar differentiating and clipping circuit 16. The differentiating and clipping circuit 16 provides positive-going pulses corresponding to the trailing or negative-going edge of the squared frequency modulated signal at the output of the amplifying and squaring circuit 10, as shown by the wave form of FIGURE 2F.

The respective pulse trains developed by the differentiating and clipping circuits are applied to a pair of pulse former circuits 18 and 20. These circuits, which will be hereinafter described in more detail, are monostable multivibrator type circuits which provide pulses of fast rise and fall times. The particular circuits are arranged to provide pulses in which the time duration between the rise and fall times is accurately controlled and maintained substantially constant over a wide range of pulse repetition rates by a "Zero and Balance" control, indicated at 21. The wave forms of the outputs of the respective pulse formers are shown in FIGURES 2E and 2G.

The output signals from the pulse formers 18 and 20 are combined in an "or" gate 22 and applied to a limiter circuit 24. The limiter circuit fixes the amplitude of the pulses so that the pulses at the output of the limiter are of constant area, that is they are controlled in both duration and amplitude. The wave form of the signal at the output of the limiter is shown in FIGURE 2H. It will be seen on examination that the wave form at the output of the limiter 24 consists of a series of positive-going pulses of constant area with the time between the positive-going pulses varying according to the changes in frequency of the frequency modulated carrier signal.

The output from the limiter circuit 24 is applied to a low-pass filter which has an upper cutoff at the maximum frequency of the modulating or information signal. The low-pass filter generates an output signal that varies in amplitude with the average of the input signal or the D.C. component of the input signal as illustrated by the shaded areas above and below the dashed line in FIGURE 2H, producing the demodulated output signal corresponding to the dashed line of FIGURE 2H as indicated in FIGURE 2J. The linearity of the demodulator circuit of FIGURE 1 depends in large part on controlling the area of the positive-going portions of the wave form in FIGURE 2H such that the area of the positive-going pulses is constant. This is accomplished by the pulse formers 18 and 20 and the limiter 24. A schematic diagram of the pulse former circuits and the limiter is shown in FIGURE 3, which includes the schematic for all of the portions of the demodulator shown within the dash line indicated at 28 in FIGURE 1.

Figure 3:
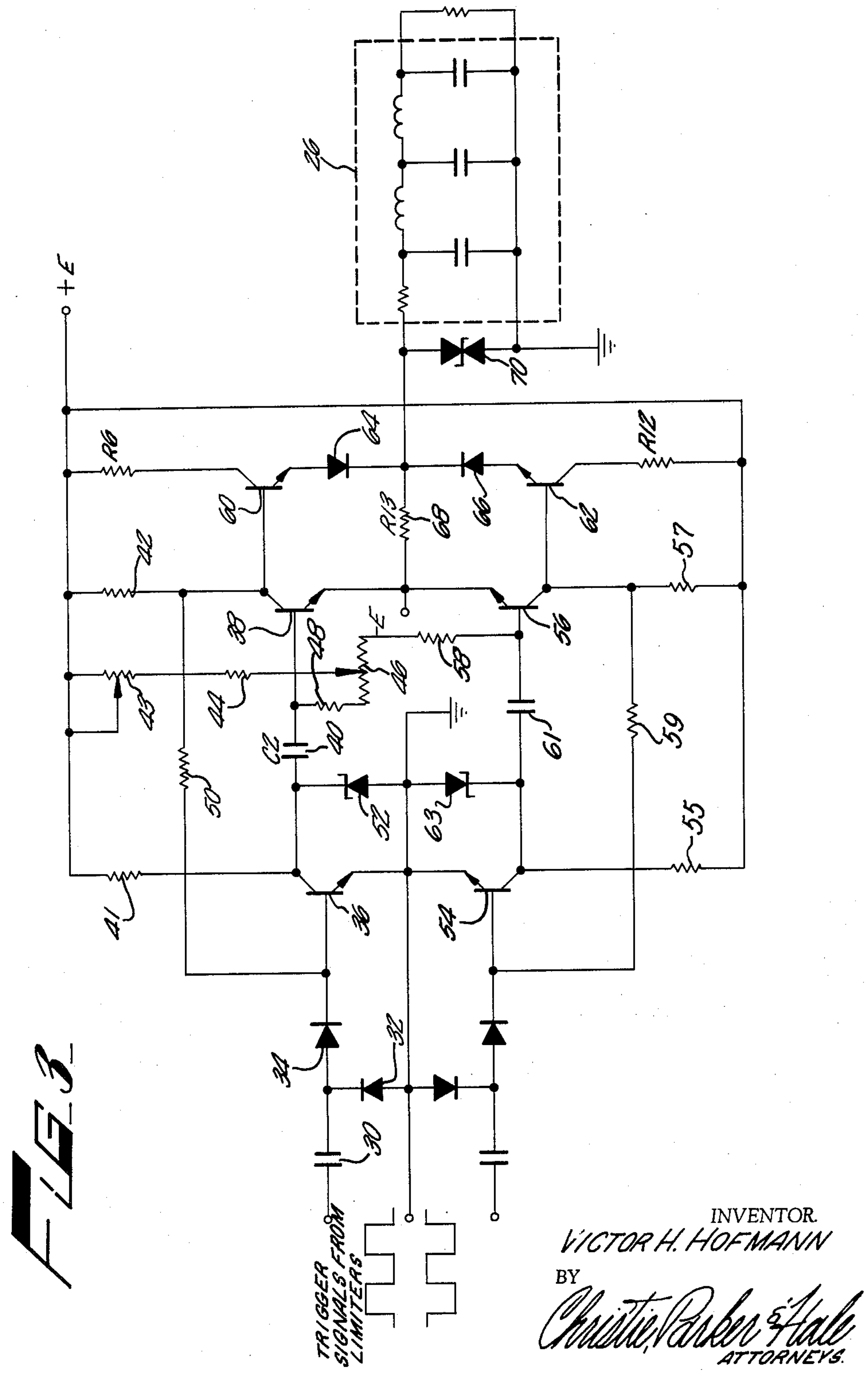
FIGURE 3 is a schematic circuit diagram.

Referring to FIGURE 3 in detail, the two signals from the phase splitting circuit 12 are first differentiated. Since the circuits for the two signals are identical, only the circuit of the upper input signal will be considered in detail. Differentiation is accomplished by a series capacitor 30 and a shunting diode 32. Only the positive-going portions of the differentiated wave form are passed by a clipping diode 34.

These positive pulses at the output of the diode 34 are coupled to a monostable multivibrator circuit which includes two NPN junction transistors 36 and 38. The transistor 36 has its emitter connected to ground and its collector connected to a positive potential source +E through a load resistor 41. Since the base of the transistor 36 is normally clamped at negative potential by virtue of the connection through resistor 50 and the diodes 32 and 34, the transistor 36 is normally nonconductive.

The collector of the transistor 36 is coupled to the base of the transistor 38 through a coupling capacitor 40. The collector of the transistor 38 is connected to the positive potential source +E through a load resistor 42 while the emitter is directly connected to a negative potential source —E. The base 38 is normally held at a positive bias potential by means of a resistance circuit connecting the base to the positive potential source. The resistance circuit includes a variable resistor 43, a temperature compensating resistor 44, a portion of a potentiometer 46, and a resistor 48. The variable resistor 43 and potentiometer 46 comprise the "Zero and Balance" control 21 in the block diagram of FIGURE 1. Because of the positive potential on the base of the transistor 38, the transistor 38 is normally conductive. Thus a charge is built up on the capacitor 40 which is roughly equal to the sum of the potential of the negative source —E and the zener voltage of diode 52.

When a positive pulse is applied to the base of the transistor 36, the transistor 36 is turned on and the potential on the collector drops to substantially ground potential. This drives the base of the transistor 38 to a negative potential, causing the transistor 38 to be cut off. A feedback resistor 50 connects the collector of the transistor 38 back to the base of the transistor 36 so that as long as the transistor 38 is cut off and its collector is substantially at the potential of the positive source, the transistor 36 remains conductive. As the capacitor 40 begins to discharge through the resistors 43, 44, 46, 48, the plus supply and the transistor 36, the potential on the base of the transistor 38 begins to rise at a rate determined by the size of the capacitor 40 and the resistance provided by the series resistors 43, 44, 46, and 48 as well as the internal impedance of the potential source.

When the transistor 38 is again turned on, the collector potential drops and the transistor 36 is turned off through the feedback resistor 50. The collector of the transistor 36 gradually rises to the value of the positive potential source as the capacitor 40 is recharged through the transistor 38. It will be seen that the collector of the transistor 38 goes positive for a time during which the transistor 36 is conductive. This time duration is controlled by the discharging of the capacitor 40 through the resistance of the base biasing circuit.

If subsequent pulses are received at the input of the monostable multivibrator before the capacitor 40 becomes fully charged, this discharge time will be shorter thus producing a shorter time duration of the positive-going pulse derived from the collector of the transistor 38. In order to get a constant area pulse as required to achieve good linearity, as discussed above, a zener diode 52 is provided in the circuit which connects the collector of the transistor 36 to ground. The zener diode has the characteristic that it breaks down and becomes conductive when the back voltage exceeds a predetermined value. Thus the zener diode can be used as a voltage regulating device. In the circuit of FIGURE 3, when the transistor 36 is turned off and the collector potential begins to rise as the capacitor 40 is recharged, a back voltage is developed across the zener diode 52. The voltage on the collector of the transistor 36 rises until the zener diode 52 breaks down, rendering the zener diode 52 conductive and clamping the potential at the collector at some constant voltage level. This fixes the voltage drop across the capacitor 40 to some value considerably below the potential of the positive source. Because the capacitor 40 tries to recharge exponentially to the full potential of the source +E, it very quickly charges up to the clamping level of the zener diode 52. Thus the recovery time of the monostable multivibrator circuit is greatly reduced by the addition of the zener diode.

For wide deviation FM recording, with a 50% duty cycle at the carrier frequency, at maximum deviation, the constant area pulse may occupy 95% of the duty cycle. In other words, the duration of the positive-going or constant area pulse at the input to the filter may constitute as much as 95% of the time interval between successive positive pulses. The remaining 5% of the pulse repetition interval is all that remains for recovery time of the monostable circuit. Even with the zener diode arrangement described above, the monostable multivibrator may not be able to recover in this time interval at the high frequencies involved. For this reason the two channel arrangement described above is employed in which a second monostable multivibrator is provided. The two multivibrator circuits by virtue of the phase splitting arrangement are triggered alternately. By this arrangement, while one monostable multivibrator circuit is being triggered, the other monostable multivibrator circuit is recovering.

As shown in FIGURE 3, the second monostable multivibrator includes a pair of transistors 54 and 56 which are connected in identical fashion as the transistors 36 and 38 described above. The collectors of the transistors 54 and 56 are connected to the +E source respectively by load resistors 55 and 57. The collector of the transistor 56 is coupled to the base of the transistor 54 through a feedback resistor 59 while the collector of the transistor 54 is connected to the base of the transistor 56 by a capacitor 61. A zener diode 63 is connected across the collector and emitter of the transistor 54. The bias voltage on the base of the transistor 56 is derived from the opposite end of the potentiometer 46 through a resistor 58. The variable resistor 43 and the potentiometer 46 provide independent adjustments for balancing the recovery time of the two multivibrator circuits and adjusting the duty cycle to 50% of the carrier frequency for obtaining a D.C. zero setting at the output of the filter.

Separate outputs form the transistors 38 and 56 are provided through a pair of emitter follower stages including transistors 60 and 62. The emitters of these two transistors are connected through an "or" gate consisting of a pair of diodes 64 and 66 connected through a common resistor 68 back to the emitters of the transistors 38 and 56 and also —E. The operation of the limiter 24 of FIGURE 1 is provided by the double anode zener reference diode 70 connected across the input to the low-pass filter 26. This zener reference diode ensures that the positive and negative voltage swings at the output of the "or" gate are symmetrical with respect to ground.

Thus the present invention provides a pulse averaging demodulator capable of a high degree of linearity. The pulse forming circuits operate alternately and can be accurately balanced by resistor 43 to give pulses of equal area with a 50% duty cycle at the input to the filter at the carrier frequency. Adjustment of the potentiometer 46 provides a means of cancelling non-doubled carrier frequency components from the frequency doubled output signal.

What is claimed is:

1. A circuit for demodulating a frequency modulated signal comprising means responsive to the frequency modulated signal for generating a first train of pulses occurring at time intervals corresponding to the time periods of full cycle of the frequency modulated signal, means responsive to the frequency modulated signal for generating a second train of pulses occurring at time intervals corresponding to the time periods of full cycles of the frequency modulated signal but delayed a half cycle in relation to the pulses of the first train, first and second monostable circuits each including first and second transistors, each transistor having three terminals, the first train of pulses and the second train of pulses being coupled respectively to a first terminal of the first transistor in the two monostable circuits, a capacitor connecting a second terminal of the first transistor to a first terminal of the second transistor, a resistor connecting a second terminal of the second transistor to the first terminal of the first transistor, two resistors respectively connecting the second terminals of the two transistors to a first potential source, the third terminal of the first transistor being connected to a reference potential and the third terminal of the second transistor being connected to a second potential source, and a first zener diode connected across the second and third terminals of the first transistor, a potentiometer connected between the first terminals of the second transistors in the two monostable circuits, a variable resistor connecting the tap on the potentiometer to a source of potential, a low-pass filter, and means for combining and coupling output signals derived from the second terminals of the second transistor to the input of the filter.

2. A circuit for demodulating a frequency modulated signal comprising means responsive to the frequency modulated signal for generating a first train of pulses occurring at time intervals corresponding to the time periods of full cycles of the frequency modulated signal, means responsive to the frequency modulated signal for generating a second train of pulses occurring at time intervals corresponding to the time periods of full cycles of the frequency modulated signal but delayed a half cycle in relation to the pulses of the first train, first and second monostable circuits each including first and second transistors, each transistor having three terminals, the first train of pulses and the second train of pulses being coupled respectively to a first terminal of the first transistor in the two monostable circuits, a capacitor connecting a second terminal of the first transistor to a first terminal of the second transistor, a resistor connecting a second terminal of the second transistor to the first terminal of the first transistor, two resistors respectively connecting the second terminals of the two transistors to a first potential source, the third terminal of the first transistor being connected to a reference potential and the third terminal of the second transistor being connected to a second potential source, and a first zener diode connected across the second and third terminals of the first transistor, means for normally biasing the second transistors of both monostable circuits conductive, a low-pass filter, and means for combining and coupling output signals derived from the second terminals of the second transistors to the filter input.

3. A circuit for demodulating a frequency modulated signal comprising means responsive to the frequency modulated signal for generating a first train of pulses occurring at time intervals corresponding to the time periods of full cycles of the frequency modulated signal, means responsive to the frequency modulated signal for generating a second train of pulses occurring at time intervals corresponding to the time periods of full cycles of the frequency modulated signal but delayed a half cycle in relation to the pulses of the first train, first and second monostable circuits triggered respectively by pulses from the first and second trains, including first and second transistors, each transistor having three terminals, a capacitor connecting a second terminal of the first transistor to a first terminal of the second transistor, means connecting a second terminal of the second transistor to the first terminal of the first transistor, two resistors respectively connecting the second terminals of the two transistors to a first potential source, the third terminal of the first transistor being connected to a reference potential and the third terminal of the second transistor being connected to a second potential source, and a first zener diode connected across the second and third terminals of the first transistor, a potentiometer connected between the first terminals of the second transistors, a variable resistor connecting the tap on the potentiometer to a source of potential, a low-pass filter, and means for combining and coupling output signals derived from the second terminals of the second transistors to the filter input.

4. A circuit for demodulating a frequency modulated signal comprising means responsive to the frequency modulated signal for generating a first train of pulses occurring at time intervals corresponding to the time periods of full cycles of the frequency modulated signal, means responsive to the frequency modulated signal for generating a second train of pulses occurring at time intervals corresponding to the time periods of full cycles of the frequency modulated signal but delayed a half cycle in relation to the pulses of the first train, first and second monostable circuit triggered respectively by pulses from the first and second trains including first and second transistors, each transistor having three terminals, a capacitor connecting a second terminal of the first transistor to a first terminal of the second transistor, means connecting a second terminal of the second transistor to the first terminal of the first transistor, two resistors respectively connecting the second terminals of the two transistors to a first potential source, the third terminal of the first transistor being connected to a reference potential and the third terminal of the second transistor being connected to a second potential source, and a first zener diode connected across the second and third terminals of the first transistor, means for normally biasing the second transistors conductive, a low-pass filter, and means for combining and coupling output signals derived from the second terminals of the second transistors to the filter input.

5. A circuit for demodulating a frequency modulated signal comprising means responsive to the frequency modulated signal for generating a first train of pulses occurring at time intervals corresponding to the time periods of full cycles of the frequency modulated signal, means responsive to the frequency modulated signal for generating a second train of pulses occurring at time intervals corresponding to the time periods of full cycles of the frequency modulated signal but delayed a half cycle in relation to the pulses of the first train, a first monostable circuit triggered by pulses from the first train for generating pulses of constant area, a second monostable circuit triggered by pulses from the second train for generating pulses of constant area, a low-pass filter, and means for combining and coupling output signals derived from the first and second monostable circuits to the low-pass filter.

6. A demodulator for frequency modulated signals comprising means for squaring the modulated signal, means for splitting the squared signal into two squared signals of opposite phase, means for deriving pulses at the leading edges of the positive-going portions of each of said two signals of opposite phase, means for generating two groups of pulses of constant area in response to the pulses derived from the leading edges of said two signals of opposite phase, means for combining the two groups of constant area pulses in a common output, a low-pass filter, and amplitude limiting means coupling the output signal combining means to the low-pass filter.

7. A demodulator for frequency modulated alternating current signals comprising means responsive to the frequency modulated signal for generating a first group of fixed duration pulses having the leading edge of each pulse synchronized with the start of each positive half cycle of the frequency modulated signal, means responsive to the frequency modulated signal for generating a second group of fixed duration pulses having the leading edge of each pulse synchronized with the start of each negative half cycle of the frequency modulated signal, the pulses of the first and second groups having the same time duration, means for combining the first and second groups of pulses into a single pulse train, means for fixing the amplitude of the pulses in said train to a predetermined amplitude, low-pass filter means, and means coupling the pulse train from the output of the amplitude fixing means to the input of the low-pass filter.

References Cited by the Examiner

UNITED STATES PATENTS

| | | | |
|---|---|---|---|
| 2,113,214 | 4/1938 | Luck | 332—1 |
| 2,922,040 | 1/1960 | Browder | 329—112 |
| 2,970,228 | 1/1961 | White et al. | 307—88.5 |
| 3,086,175 | 4/1963 | Barditch et al. | 329—132 |
| 3,125,691 | 3/1964 | Astheimer | 307—88.5 |

OTHER REFERENCES

Dept. of the Army Technical Manual TM 11–690, March 1959, Lib. No. TK6550–U69, No. 690–C.5, Basic Theory and Application of Transistors, page 200, Fig. 194.

HERMAN KARL SAALBACH, *Primary Examiner.*

ALFRED L. BRODY, ROY LAKE, *Examiners.*